United States Patent

Lee

Patent Number: 6,046,784
Date of Patent: Apr. 4, 2000

[54] METHOD AND APPARATUS FOR CONCEALING ERRORS IN A BIT STREAM

[75] Inventor: Sang-Hoon Lee, Seoul, Rep. of Korea

[73] Assignee: Daewoo Electronics Co., Ltd., Rep. of Korea

[21] Appl. No.: 08/914,929

[22] Filed: Aug. 20, 1997

[30] Foreign Application Priority Data

Aug. 21, 1996 [KR] Rep. of Korea ......... 96-34626
Aug. 21, 1996 [KR] Rep. of Korea ......... 96-34627

[51] Int. Cl.⁷ ............................................. H04N 7/64
[52] U.S. Cl. .................. 348/845.1; 348/461; 348/466; 714/747
[58] Field of Search ............... 348/845, 845.1, 348/845.2, 466, 461; 714/747, 800; H04N 7/64

[56] References Cited

U.S. PATENT DOCUMENTS

| | | | |
|---|---|---|---|
| 5,159,452 | 10/1992 | Kinoshita et al. | 348/461 |
| 5,309,450 | 5/1994 | Kim | 348/469 |
| 5,442,400 | 8/1995 | Sun et al. | 348/409 |
| 5,809,041 | 9/1998 | Shikakura et al. | 348/466 |

Primary Examiner—Tommy P. Chin
Assistant Examiner—John A. Voisinet
Attorney, Agent, or Firm—Anderson Kill & Olick

[57] ABSTRACT

Bit streams are divided on a block-by-block basis based on information of bit numbers and a parity bit added to each bit stream is checked to generate a switching signal. Either each bit stream or a proximate bit stream for each bit stream is selected as an optimum bit stream based on the switching signal, wherein the proximate bit stream is generated based on degrees of proximity for reference bit streams spatially adjacent to each bit stream, and the optimum bit stream is decoded to generate decoded data on a block-by-block basis.

10 Claims, 2 Drawing Sheets

METHOD AND APPARATUS FOR CONCEALING ERRORS IN A BIT STREAM

FIELD OF THE INVENTION

The present invention relates to a method and apparatus for concealing errors in a bit stream; and, more particularly, to a method and apparatus capable of concealing bit errors in a bit stream transmitted from a block-based image signal encoder by the use of a bit inversion technique.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially in the case of such low bit-rate video signal encoders as video-telephone and teleconference systems. Among various video compression techniques, the so-called hybrid coding technique, which combines temporal and spatial compression techniques together with a statistical coding technique, is known to be most effective.

Most hybrid coding techniques employ orthogonal transform, quantization of transform coefficients, and Variable Length Coding(VLC). The orthogonal transform, which reduces or removes spatial redundancies therebetween, is used to convert a block of digital image data into a set of transform coefficients. Specifically, in the orthogonal transform such as a Discrete Cosine Transform (DCT) or the like, the image data is divided into a plurality of non-overlapping equal-sized blocks, for example, blocks of 8×8 pixels, and each of the blocks is transformed from the spatial domain to the frequency domain.

By processing such transformation coefficient data with quantization and VLC, the amount of data to be transmitted can be effectively compressed. Thereafter, the encoded image signal is transmitted to a decoder via a transmitted channel.

Since, however, errors are apt to occur during the transmission process, in order to reduce or rectify the errors, conventionally, a channel coding has been carried out with respect to the encoded image signal by employing various error control coding methods. In a conventional error control coding method, extra bits are added to each predetermined set of source codes to detect and conceal the errors during a decoding process. Various error concealment schemes such as a POCS(Projections onto Convex Sets) method have been proposed to conceal or estimate the pixel data of an error containing block, to thereby compensate for the degradation which may have occurred in the transmission process. However, such prior art error concealment methods remain unsatisfactory as they fail to fully take into account the characteristics of a given image signal.

Besides, blocking effect, which is a phenomenon that the border line of a block becomes visible at the receiving end, occurs since a frame is encoded in units of blocks; and may become more serious as the quantizer step size becomes larger, i.e., as the frequency of the coefficient becomes higher, in which case the blocks undergo more coarse quantization. Accordingly, if a certain block is much brighter or darker than its adjacent block, and, a fixed large quantizer step size is used for an intra block DC coefficient, the intensity difference between said certain block and its adjacent blocks may become even more pronounced, resulting in a more severe blocking effect and depreciating the quality of the image. Although in an inter mode coding with motion compensated frame prediction, blocking effects are not so disturbing, but are still noticeable.

Therefore, if one or more bit errors generated by a transmission channel environment or the like are detected in video signals expressed in a multiplicity of bit streams, it is required to correct or conceal the bit errors by taking into account neighbor bit streams adjacent to any bit stream in which errors are detected.

SUMMARY OF THE INVENTION

It is, therefore, a primary object of the invention to provide a method and apparatus capable of concealing errors in a bit stream transmitted from a block-based image signal encoder by the use of a bit inversion technique based on the neighbor bit streams adjacent to any bit stream that contains the errors.

In accordance with the present invention, there is provided a method for concealing errors in a bit stream based on a parity bit added on a block-by-block basis, wherein a video frame is divided by a plurality of equal-sized blocks and the video signals for the blocks are encoded into bit streams whose bit numbers are different from each other, the method comprising the steps of:

(a) finding sequentially bit streams corresponding to the blocks based on the bit numbers thereof;

(b) checking a parity bit added to each bit stream to generate a switching signal, wherein the switching signal indicates whether or not said each bit stream is error bit stream having one or more errors therein;

(c) selecting either said each bit stream or a proximate bit stream for said each bit stream as an optimum bit stream based on the switching signal, wherein the proximate bit stream is generated based on degrees of proximity for reference bit streams spatially adjacent to the error bit stream; and (d) decoding the optimum bit stream to generate decoded data on a block-by-block basis.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
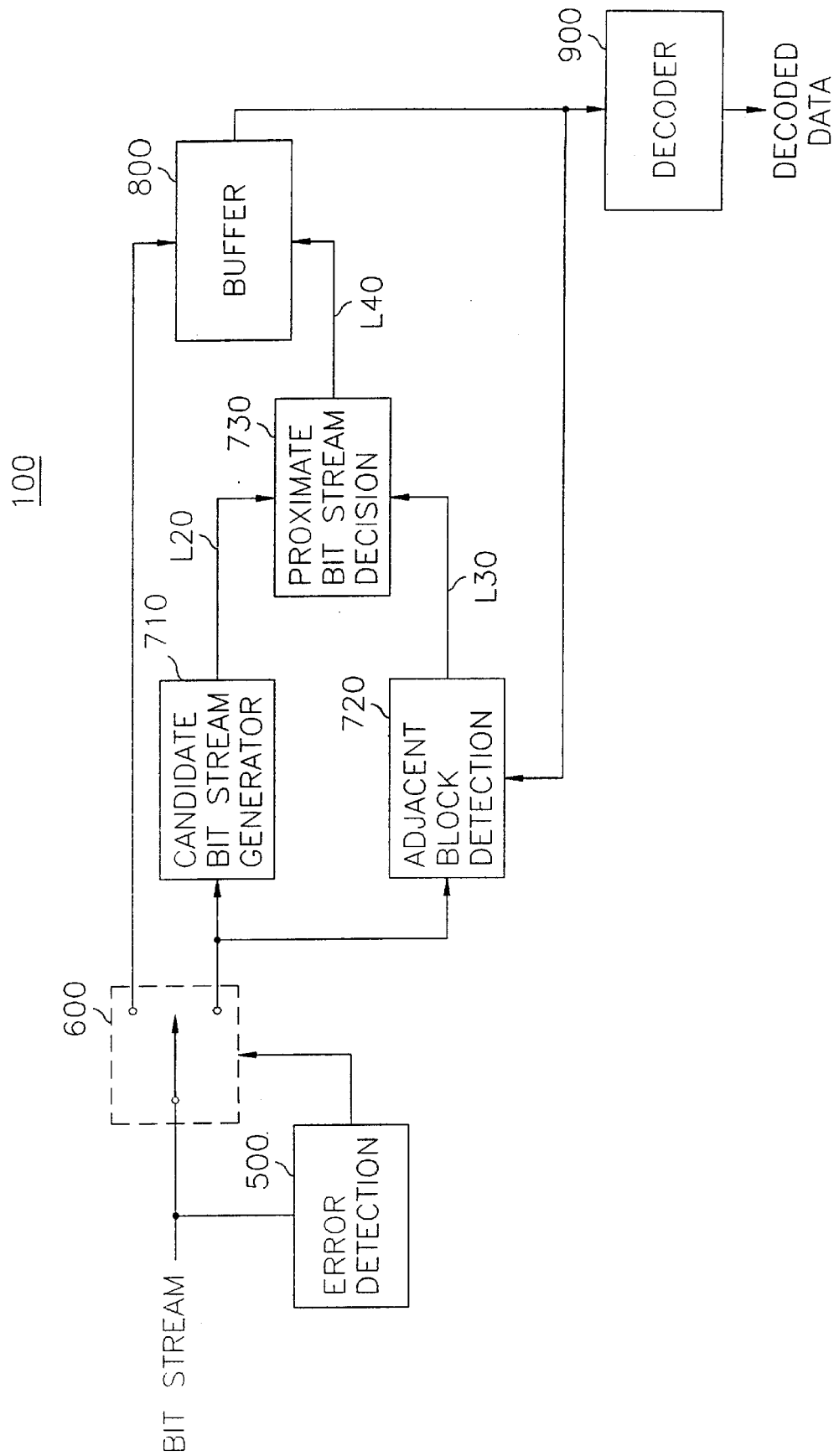
FIG. 1 shows a schematic block diagram of an apparatus for correcting bit errors by the use of a bit-inversion technique in accordance with the present invention.

Referring to FIG. 1, there is shown a block diagram of an apparatus 100 for detecting and concealing one or more errors in a video signal of a video image frame expressed in a sequence of bits, i.e., a bit stream in accordance with the present invention, wherein the video image frame is divided into and processed as a plurality of equal-sized blocks whose width and height may be 8×8 or 16×16 pixels.

The bit stream transmitted through a transmission channel is provided to an error detection circuit 500 and a switch 600, wherein said each bit stream contains a parity bit as well as video signals on a block-by-block basis. The error detection circuit 500 sequentially receives bit streams for blocks, detects whether a bit stream corresponding to each block has one or more error bits through a parity check and provides a switching signal representing the result of the error detection for said each block to the switch 600.

If errors are detected in a bit stream for a block, the switch 600 transmits the bit stream for the block to a candidate bit stream generator 710 and an adjacent block detection circuit 720 and, if otherwise, the switch 600 transmits the bit stream to a buffer 800 directly.

If the bit stream for the block is determined to have an error so that the bit stream and the block are referred to as an error bit stream and an error block, respectively, the candidate bit stream generator 710 inverts any one bit in the error bit stream to generates a plurality of candidate bit streams. In other words, each candidate bit stream differs one bit from the error bit stream so that the candidate bit streams differ from each other as much as two bits. For example, if an error bit stream "01011001" is provided with one bit error, 8 number of candidate bit streams are generated as follows:

|          |          |
|----------|----------|
| 11011001 | 01010001 |
| 00011001 | 01011101 |
| 01111001 | 01011011 |
| 01001001 | 01011000 |

All the candidate bit streams are sequentially provided to a proximate bit stream decision circuit 730 via a line L20 on a candidate bit stream basis.

In another instance of the invention, specifically, if an error bit stream has two or more bit errors, candidate bit stream can be generated by taking account of the reference bit streams of the error bit stream. For example, four bit streams positioned at an upper-left, an upper, an upper-right and a left corners of the error block can be determined as the candidate bit streams. In another preferred embodiment of the invention, a mean bit stream and a zero bit stream can be added to the four bit streams to make six candidate bit streams, wherein the mean bit stream represents a mean of said four bit streams and all bits of the zero bit stream are "0". The candidate bit streams determined by using the reference bit streams can be effectively used to conceal a plurality of errors detected in motion vector of a current block in an inter mode and, therefore, to reduce or to remove the blocking effect.

In the meantime, the neighbor block detection circuit 720 determines neighbor blocks of the error block based on the position data thereof and retrieves bit streams of the neighbor blocks from the buffer 800, the neighbor blocks having a predetermined positional relationship with the error block. For instance, two blocks positioned at the upper and the left corners of the error block can be determined as the neighbor blocks, referring to as the left and the upper blocks. In another instance of the invention, another set of blocks, e.g., at the upper, the left and the upper-left of the error block can be decided as the neighbor blocks. The bit streams of the neighbor blocks are provided to the proximate bit stream decision circuit 730 as reference bit streams to the error bit stream of the error block.

In response to the reference bit streams, the proximate bit stream decision circuit 730 determines a proximate bit stream of the error bit stream and provides same to the buffer 800, wherein the proximate bit stream is selected among the candidate bit streams based on the degrees of proximity between the candidate bit streams and the reference bit streams.

Figure 2:
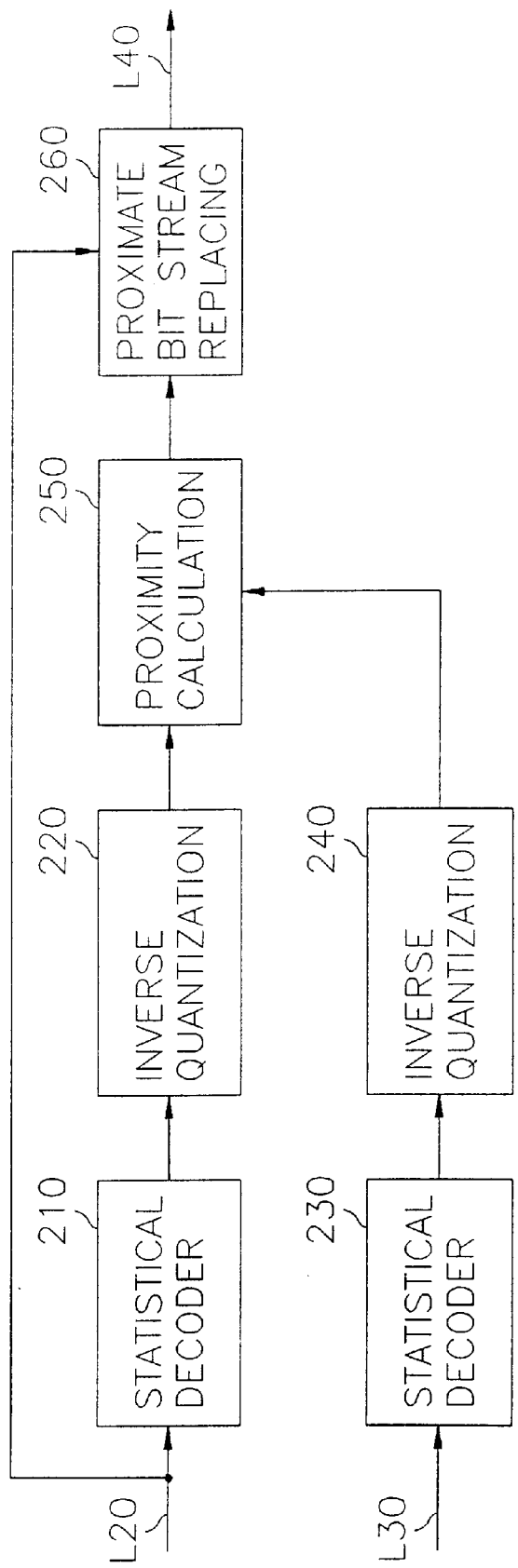
FIG. 2 presents an explanatory diagram for a proximate bit stream decision circuit in accordance with the present invention.

Referring to FIG. 2, there is illustrated a preferred embodiment of the proximate bit stream decision circuit 730 of FIG. 1, wherein all the candidate bit streams are sequentially provided to a statistical decoder 210 and a proximate bit stream replacing circuit 260 via the line L20 from the candidate bit stream generator 710; and all the reference bit streams of neighbor blocks are provided to a statistical decoder 230 via the line L30 from the adjacent block detection circuit 720.

First of all, at the statistical decoder 210, each candidate bit stream is decoded by using, e.g., a variable length decoding (VLD) technique to produce statistically decoded data. Then, the inverse quantization circuit 220 performs inverse quantization (IQ) on the statistically decoded data from the statistical decoder 210 to provide a set of transform coefficients corresponding to each candidate bit stream as a set of candidate transform coefficients to a proximity calculation circuit 250.

In the meantime, the statistical decoder 230 performs statistical decoding on the reference bit streams of the neighbor blocks to produce statistically decoded data; and an inverse quantization circuit 240 performs inverse quantization (IQ) on the statistically decoded data to provide a set of transform coefficients on each reference bit stream as a set of reference transform coefficients to the proximity calculation circuit 250.

The proximity calculation circuit 250 calculates a degree of proximity for each candidate bit stream in a frequency domain, not a space domain, to provide same to the proximate bit stream replacing circuit 260. In other words, the degree of proximity for said each candidate bit stream is calculated based on a set of candidate transform coefficients of said each candidate bit stream and all sets of reference transform coefficients of all the reference bit streams. If the upper and the left bit streams of the upper and the left blocks are selected as the reference bit streams, the degree of proximity ETOTAL for each candidate bit stream is defined as follows:

$$E_{TOTAL} = E_U + E_L$$

wherein an upper and a left proximities $E_U$ and $E_L$ represent the degrees of proximity between each set of candidate transform coefficients and the sets of reference transform coefficients of the upper and the left blocks, respectively. The upper and the left proximities $E_U$ and $E_L$ for each candidate bit stream are calculated as follows, respectively:

$$E_U = \sum_{j=1}^{N} W_j (C_j^{CAN} - C_j^U)^2$$

$$E_L = \sum_{j=1}^{N} W_j (C_j^{CAN} - C_j^L)^2$$

wherein $C_j^{CAN}$ and $C_j^L$ represent j-th transform coefficient of said each candidate, the upper and the left bit streams, respectively, $W_j$ is a weight function which depends on the j-th transform coefficient and N is the total number of transform coefficients.

The proximate bit stream replacing circuit 260 compares all the degrees of proximity with each other to select a smallest among the degrees of proximity of all the candidate bit streams fed from the proximity calculation block 250; substitutes the error bit stream with a proximate bit stream, wherein the proximate bit stream represents a candidate bit stream corresponding to the smallest degree of proximity among all the candidate bit streams fed from the candidate bit stream generator 710 shown in FIG. 1 via the line L20; and provides the proximate bit stream to the buffer 800 shown in FIG. 1 via a line L40.

Referring back to FIG. 1, the buffer 800 stores therein an optimum bit stream for each block by using the position data thereof, wherein the optimum bit stream is either the bit stream itself transmitted from the switch 600 or the proximate bit stream fed from the proximate bit stream decision circuit 730, and provides the optimum bit stream to the decoder 900.

The decoder 900 decodes the optimum bit stream based on the conventional decoding technique, e.g., VLD, IQ and inverse discrete cosine transform (IDCT) to generate decoded data for the block.

While the present invention has been described with respect to the particular embodiments, it will be apparent to those skilled in the art that various changes and modifications may be made without departing from the spirit and scope of the invention as defined in the following claims.

What is claimed is:

1. A method for concealing errors in a bit stream based on a parity bit added on a block-by-block basis, wherein a video frame is divided by a plurality of equal-sized blocks and the video signals for the blocks are encoded into bit streams whose bit numbers are different from each other, the method comprising the steps of:

(a) finding sequentially bit streams corresponding to the blocks based on the bit numbers thereof;

(b) checking a parity bit added to each bit stream to generate a switching signal, wherein the switching signal indicates whether or not said each bit stream is error bit stream having one or more errors therein;

(c) selecting either said each bit stream or a proximate bit stream for said each bit stream as an optimum bit stream based on the switching signal, wherein the proximate bit stream is generated based on degrees of proximity for reference bit streams spatially adjacent to the error bit stream; and (d) decoding the optimum bit stream to generate decoded data on a block-by-block basis; wherein, if the switching signal for the error bit stream is generated, said selecting step includes the steps of:

(c1) generating a plurality of candidate bit streams, wherein each candidate bit stream can be substituted for the error bit stream;

(c2) detecting a multiplicity of reference bit streams, wherein each reference bit stream is adjacent to the error bit stream and has no errors or has already concealed errors therein; and (c3) determining the proximate bit stream among the candidate bit streams based on the degrees of proximity between the candidate bit streams and the reference bit streams.

2. The method according to claim 1, wherein each candidate bit stream differs one bit from the error bit stream.

3. The method according to claim 1, wherein the candidate bit streams are determined based on the reference bit streams.

4. The method according to claim 1, wherein said determining step (c3) has the steps of:

(c31) decoding each candidate bit stream to obtain transform coefficients for said each candidate bit stream;

(c32) decoding each reference bit stream to obtain transform coefficients for said each reference bit stream;

(c33) calculating sequentially each degree of proximity between the transform coefficients for said each candidate bit stream and the transform coefficients for said each reference bit stream; and (c34) comparing the degrees of proximity with each other to choose a smallest degree of proximity among them; and (c35) substituting the error bit stream with a candidate bit stream corresponding to the smallest degree of proximity.

5. The method according to claim 4, wherein each degree of proximity $E_{REF}$ of each candidate bit stream and each reference bit stream is calculated as follows:

$$E_{REF} = \sum_{j=1}^{N} W_j (C_j^{CAN} - C_j^{REF})^2$$

wherein $C_j^{CAN}$ and $C_j^{REF}$ represent j-th transform coefficient of said each candidate and said each reference bit stream, respectively, $W_j$ is a weight function which depends on the j-th transform coefficient and N is the total number of transform coefficients.

6. An apparatus for concealing errors in a bit stream based on a parity bit added on a block-by-block basis, wherein a video frame is divided by a plurality of equal-sized blocks and the video signals for the blocks are encoded into bit streams whose bit numbers are different from each other, the apparatus comprising:

means for finding sequentially bit streams corresponding to the blocks based on the bit numbers thereof;

an error detection circuit for checking a parity bit added to each bit stream to generate a switching signal, wherein the switching signal indicates whether or not said each bit stream is error bit stream having one or more errors therein;

concealing means for selecting either said each bit stream or a proximate bit stream for said each bit stream as an optimum bit stream based on the switching signal, wherein the proximate bit stream is generated based on degrees of proximity for reference bit streams spatially adjacent to the error bit stream; and a decoder for decoding the optimum bit stream to generate decoded data on a block-by-block basis;

wherein said concealing means includes:

a candidate bit stream generator for generating a plurality of candidate bit streams, wherein each candidate bit stream can be substituted for the error bit stream;

an adjacent block detection circuit for detecting a multiplicity of reference bit streams, wherein each reference bit stream is adjacent to the error bit stream and has no errors or has already concealed errors therein; and a proximate bit stream decision circuit for determining the proximate bit stream among the candidate bit streams based on the degrees of proximity between the candidate bit streams and the reference bit streams.

7. The apparatus according to claim 6, wherein each candidate bit stream differs one bit from the error bit stream.

8. The apparatus according to claim 6, wherein the candidate bit streams are determined based on the reference bit streams.

9. The apparatus according to claim 6, wherein said proximate bit stream decision circuit has:
- a candidate decoder for decoding each candidate bit stream to obtain transform coefficients for said each candidate bit stream;
- a reference decoder for decoding each reference bit stream to obtain transform coefficients for said each reference bit stream;
- a proximity calculator for calculating sequentially each degree of proximity between the transform coefficients for said each candidate bit stream and the transform coefficients for said each reference bit stream; and
- a comparator for comparing the degrees of proximity with each other to choose a smallest degree of proximity; and
- a substituter for substituting the error bit stream with a candidate bit stream corresponding to the smallest degree of proximity.

10. The apparatus according to claim 9, wherein each degree of proximity $E_{REF}$ of each candidate bit stream and each reference bit stream is calculated as follows:

$$E_{REF} = \sum_{j=1}^{N} W_j (C_j^{CAN} - C_j^{REF})^2$$

wherein $C_j^{CAN}$ and $C_j^{REF}$ represent j-th transform coefficient of said each candidate and said each reference bit stream, respectively, $W_j$ is a weight function which depends on the j-th transform coefficient and N is the total number of transform coefficients.

* * * * *